United States Patent
Hayashi et al.

(10) Patent No.: US 10,744,738 B2
(45) Date of Patent: *Aug. 18, 2020

(54) ANTIFOULING FILM

(71) Applicant: SHARP KABUSHIKI KAISHA, Sakai, Osaka (JP)

(72) Inventors: Hidekazu Hayashi, Sakai (JP); Atsushi Niinoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 149 days.

This patent is subject to a terminal disclaimer.

(21) Appl. No.: 16/067,052

(22) PCT Filed: Jul. 3, 2017

(86) PCT No.: PCT/JP2017/024377
§ 371 (c)(1),
(2) Date: Jun. 28, 2018

(87) PCT Pub. No.: WO2018/012342
PCT Pub. Date: Jan. 18, 2018

(65) Prior Publication Data
US 2019/0001612 A1  Jan. 3, 2019

(30) Foreign Application Priority Data
Jul. 12, 2016  (JP) ................. 2016-137926

(51) Int. Cl.
*B32B 27/18*  (2006.01)
*B32B 3/30*  (2006.01)
(Continued)

(52) U.S. Cl.
CPC ................ *B32B 3/30* (2013.01); *B32B 27/08* (2013.01); *B32B 27/18* (2013.01); *B32B 27/30* (2013.01);
(Continued)

(58) Field of Classification Search
CPC .. C08F 290/046; C08F 214/18; C08F 290/06; B32B 2250/02; B32B 2307/416;
(Continued)

(56) References Cited

U.S. PATENT DOCUMENTS

| | | |
|---|---|---|
| 2012/0267042 A1 | 10/2012 | Okafuji et al. |
| 2013/0049255 A1 | 2/2013 | Matsumoto et al. |
| 2014/0378018 A1 | 12/2014 | Kaneumi |

FOREIGN PATENT DOCUMENTS

| | | |
|---|---|---|
| JP | 2005-097371 A | 4/2005 |
| JP | 2007-178724 A | 7/2007 |

(Continued)

*Primary Examiner* — Lawrence D Ferguson
(74) *Attorney, Agent, or Firm* — ScienBiziP, P.C.

(57) ABSTRACT

The antifouling film includes a polymer layer that includes on a surface thereof an uneven structure provided with multiple projections at a pitch not longer than a wavelength of visible light. The polymer layer has a proportion of the number of fluorine atoms relative to the sum of the numbers of carbon atoms, nitrogen atoms, oxygen atoms, and fluorine atoms of 33 atom % or more on the surface of the uneven structure. The polymer layer has at least one local maximum of the proportion of the number of nitrogen atoms relative to the sum of the numbers of carbon atoms, nitrogen atoms, oxygen atoms, and fluorine atoms in a region 5 to 90 nm deep from the surface of the uneven structure. The local maximum is 0.3 atom % or more greater than the average value in a region 90 to 120 nm deep from the surface of the uneven structure.

20 Claims, 9 Drawing Sheets

(51) Int. Cl.
  *G02B 1/18*    (2015.01)
  *B32B 27/30*   (2006.01)
  *G02B 27/00*   (2006.01)
  *C09D 5/16*    (2006.01)
  *C09D 5/00*    (2006.01)
  *C08F 290/06*  (2006.01)
  *B32B 27/08*   (2006.01)
  *B32B 38/06*   (2006.01)
  *C08F 290/04*  (2006.01)
  *C08J 5/18*    (2006.01)
  *G02B 1/118*   (2015.01)

(52) U.S. Cl.
  CPC .......... *B32B 38/06* (2013.01); *C08F 290/046* (2013.01); *C08F 290/06* (2013.01); *C08J 5/18* (2013.01); *C09D 5/006* (2013.01); *C09D 5/1662* (2013.01); *C09D 5/1681* (2013.01); *G02B 1/18* (2015.01); *G02B 27/0006* (2013.01); *B32B 2250/02* (2013.01); *B32B 2307/416* (2013.01); *B32B 2457/20* (2013.01); *C08J 2333/08* (2013.01); *C08J 2335/02* (2013.01); *C08J 2379/02* (2013.01); *C08J 2433/08* (2013.01); *C08J 2435/02* (2013.01); *C08J 2479/02* (2013.01); *G02B 1/118* (2013.01)

(58) Field of Classification Search
  CPC ..... B32B 2457/20; B32B 27/08; B32B 27/18; B32B 27/30; B32B 38/06; B32B 3/30; C08J 2333/08; C08J 2335/02; C08J 2379/02; C08J 2433/08; C08J 2435/02; C08J 2479/02; C08J 5/18; C09D 5/006; C09D 5/1662; C09D 5/1681; G02B 1/118; G02B 1/18; G02B 27/0006
  See application file for complete search history.

(56) References Cited

FOREIGN PATENT DOCUMENTS

| JP | 5541272 B2 | 7/2014 |
| JP | 5744011 B2 | 7/2015 |
| JP | 2015-183082 A | 10/2015 |
| JP | 5810528 B2 | 11/2015 |
| WO | 2011/111741 A1 | 9/2011 |

(a)

(b)

(c)

(d)

ANTIFOULING FILM

TECHNICAL FIELD

The present invention relates to antifouling films. The present invention more specifically relates to an antifouling film including an uneven structure of nanometer scale.

BACKGROUND ART

Various optical films having antireflective properties have been studied (for example, see Patent Literatures 1 and 2). In particular, optical films having an uneven structure of nanometer scale (nanostructure) are known for their excellent antireflective properties. This uneven structure has a continuously varying refractive index from the air layer to the substrate, thereby capable of reducing the reflected light significantly.

CITATION LIST

Patent Literature

Patent Literature 1: JP 2005-97371 A
Patent Literature 2: JP 5810528 B
Patent Literature 3: WO 2011/111741
Patent Literature 4: JP 5541272 B
Patent Literature 5: JP 2015-183082 A
Patent Literature 6: JP 5744011 B

SUMMARY OF INVENTION

Technical Problem

Although such optical films (antireflection films) have excellent antireflective properties, the uneven structure on the surface may cause easy spread of dirt such as fingerprints (sebaceous dirt) sticking thereon and may further cause difficulty in wiping off such dirt present between projections. Such sticking dirt has a reflectance that is very different from the reflectance of the antireflection film, and thus is noticeable. In order to deal with such problems, functional films (antifouling films) are strongly demanded which have on a surface thereof an uneven structure of nanometer scale to exert excellent ease of wiping off dirt (e.g. ease of wiping off fingerprints), i.e., excellent antifouling properties.

The present inventors performed studies with regard to this demand, and found that the proportion of the number of fluorine atoms on the surface of the uneven structure must be not less than a predetermined value in order to achieve an antifouling film having excellent antifouling properties. Still, further studies performed by the inventors demonstrated that some internal structures of the uneven structure caused insufficient antifouling properties (ease of wiping off dirt) even if the proportion of the number of fluorine atoms on the surface of the uneven structure is not less than a predetermined value. For example, Patent Literatures 1 and 2 state no internal structure of the uneven structure, and thus the inventions disclosed therein need to be improved in order to improve the antifouling properties.

The present invention is devised in view of the above state of the art, and aims to provide an antifouling film having excellent antifouling properties.

Solution to Problem

The present inventors performed various studies on antifouling films having excellent antifouling properties, and found that the antifouling properties are significantly improved with a structure including a region where fluorine atoms are concentrated on the surface of the uneven structure and a region where nitrogen atoms are concentrated therebelow. Finally, the present inventors have arrived at an excellent solution to the above problems, completing the present invention.

In other words, an aspect of the present invention may be an antifouling film including a polymer layer that includes on a surface thereof an uneven structure provided with multiple projections at a pitch not longer than a wavelength of visible light, the polymer layer containing carbon atoms, nitrogen atoms, oxygen atoms, and fluorine atoms as constituent atoms, the polymer layer having a proportion of the number of the fluorine atoms relative to the sum of the numbers of the carbon atoms, the nitrogen atoms, the oxygen atoms, and the fluorine atoms measured by X-ray photoelectron spectroscopy of 33 atom % or more on the surface of the uneven structure, the polymer layer having at least one local maximum of the proportion of the number of the nitrogen atoms relative to the sum of the numbers of the carbon atoms, the nitrogen atoms, the oxygen atoms, and the fluorine atoms measured by X-ray photoelectron spectroscopy in a region 5 to 90 nm deep from the surface of the uneven structure, the local maximum being 0.3 atom % or more greater than the average value in a region 90 to 120 nm deep from the surface of the uneven structure.

Advantageous Effects of Invention

The present invention can provide an antifouling film having excellent antifouling properties.

DESCRIPTION OF EMBODIMENTS

Hereinafter, the present invention is described in more detail based on an embodiment with reference to the drawings. The embodiment, however, is not intended to limit the scope of the present invention. Each of the configurations of the embodiment may appropriately be combined or modified within the spirit of the present invention.

The antifouling film as used herein means a film that enables easy removal of dirt sticking to a surface.

The expression "X to Y" as used herein means "not lower than X and not greater than Y".

Embodiment

Figure 1:
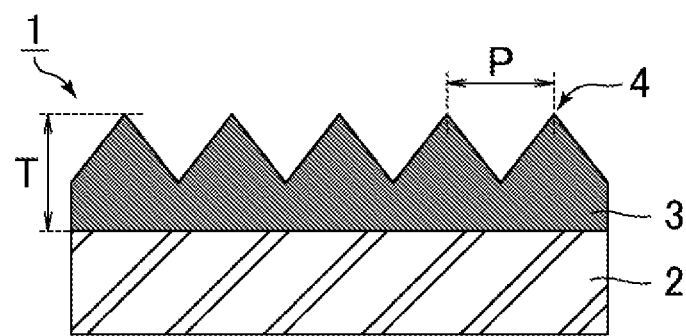
FIG. 1 is a schematic cross-sectional view of an antifouling film of an embodiment.
Figure 2:
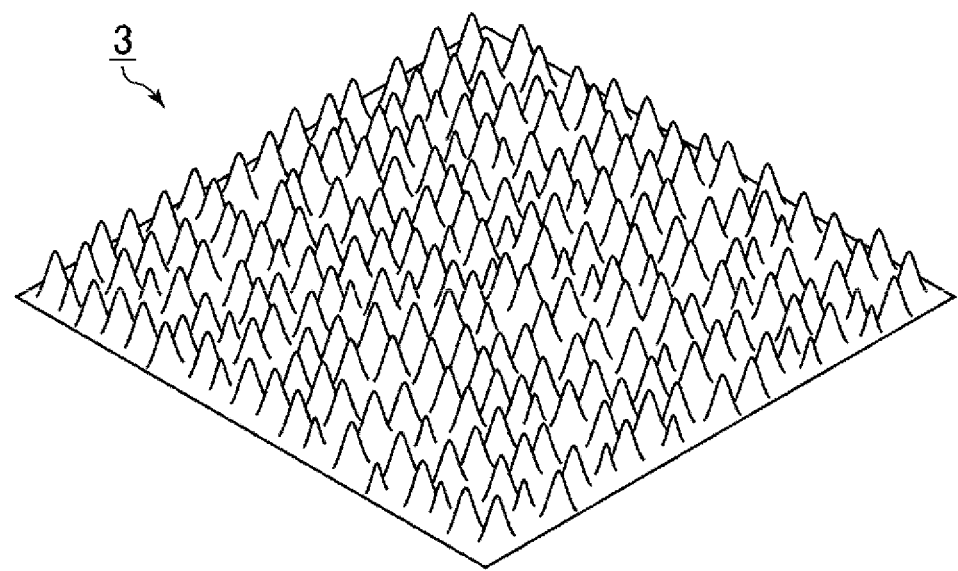
FIG. 2 is a schematic plan view of a polymer layer in FIG. 1.

An antifouling film of an embodiment is described below with reference to FIG. 1 and FIG. 2. FIG. 1 is a schematic cross-sectional view of the antifouling film of the embodiment. FIG. 2 is a schematic plan view of a polymer layer in FIG. 1.

An antifouling film 1 includes a substrate 2 and a polymer layer 3 disposed on a surface of the substrate 2.

The material of the substrate 2 may be, for example, a resin such as triacetyl cellulose (TAC), polyethylene terephthalate (PET), or methyl methacrylate (MMA). The substrate 2 may appropriately further contain an additive such as a plasticizer in addition to the above material. One surface (the surface close to the polymer layer 3) of the substrate 2 may have undergone easy adhesion treatment. For example, a triacetyl cellulose film with easy adhesion treatment may be used. One surface (the surface close to the polymer layer 3) of the substrate 2 may have undergone saponification treatment. For example, a saponified triacetyl cellulose film may be used. When the antifouling film 1 is attached to a display device provided with a polarizing plate such as a liquid crystal display device, the substrate 2 may constitute part of the polarizing plate.

In order to ensure the transparency and processability, the substrate 2 preferably has a thickness of 50 μm or greater and 100 μm or smaller.

The polymer layer 3 includes on the surface thereof an uneven structure on which multiple projections (protrusions) 4 are disposed with a pitch (distance between the apexes of adjacent projections 4) P not longer than the wavelength of visible light, i.e., a moth-eye structure (a structure like a moth's eye). Thus, the antifouling film 1 can exert excellent antireflective properties (low reflectivity) owing to the moth-eye structure.

In order to allow the active component (fluorine-containing component) of the antifouling agent as later described to be distributed on the surface (the surface opposite to the substrate 2) of the polymer layer 3 at a high concentration, the polymer layer 3 preferably has a small thickness T. Specifically, the thickness T of the polymer layer 3 is preferably 5.0 μm or greater and 20.0 μm or smaller. As shown in FIG. 1, the thickness T of the polymer layer 3 means the distance from the surface close to the substrate 2 to the apex of a projection 4.

Examples of the shape of the projections 4 include those tapering toward the tip (a tapered shape) such as shapes consisting of a columnar lower part and a hemispherical upper part (temple-bell-like shapes) and conical shapes (cone-like shapes, circular-cone-like shapes). The projections 4 may have a shape with branches. The branches are projections which are unexpectedly formed during anodizing and etching for production of a die 6 and which correspond to portions arranged at an irregular pitch. In FIG. 1, the bases of the gaps between any adjacent projections 4 are inclined, but the bases may not be inclined but may be flat.

The pitch P between adjacent projections 4 may be any value that is not longer than the wavelength of visible light (780 nm). In order to sufficiently prevent occurrence of optical phenomena such as moiré and iridescence, the pitch P is preferably 100 nm or greater and 400 nm or smaller, more preferably 100 nm or greater and 200 nm or smaller.

Each projection 4 preferably has a height of 50 nm or greater and 600 nm or smaller, more preferably 100 nm or greater and 300 nm or smaller, in order to allow each projection 4 to also have a preferred aspect ratio to be mentioned later.

Each projection 4 preferably has an aspect ratio of 0.8 or greater and 1.5 or smaller. If the aspect ratio of each projection 4 is smaller than 0.8, the film may insufficiently prevent occurrence of optical phenomena such as moiré and iridescence, possibly failing to achieve good reflection characteristics. If the aspect ratio of each projection 4 is greater than 1.5, the processability of the moth-eye structure may be poor, sticking may occur, and transferring conditions in formation of the moth-eye structure may be poor (e.g., clogging of die 6 to be described later, twining of the material). The aspect ratio of a projection as used herein means the ratio of the height of the projection of interest and the pitch between adjacent projections (height/pitch).

The projections 4 may be arranged either randomly or regularly (periodically). The projections 4 may be arranged with periodicity. Still, in order to successfully avoid unnecessary diffraction of light due to such periodicity, the projections 4 are preferably arranged without periodicity (arranged randomly) as illustrated in FIG. 2.

The polymer layer 3 contains carbon atoms, nitrogen atoms, oxygen atoms, and fluorine atoms as constituent atoms.

The polymer layer 3 has a proportion of the number of the fluorine atoms (hereinafter, also referred to as a "fluorine atom proportion") relative to the sum of the numbers of the carbon atoms, the nitrogen atoms, the oxygen atoms, and the fluorine atoms measured by X-ray photoelectron spectroscopy (XPS) of 33 atom % or more, preferably 43 atom % or more, more preferably 48 atom % or more on the surface of the uneven structure. In other words, the surface of the uneven structure has a region where fluorine atoms are concentrated. The upper limit of the fluorine atom proportion on the surface of the uneven structure is preferably 55 atom %, more preferably 50 atom %. If the fluorine atom proportion on the surface of the uneven structure is more than 55 atom %, the polymer layer 3 may unfortunately be cloudy.

The polymer layer 3 has at least one local maximum of the proportion of the number of the nitrogen atoms (hereinafter, also referred to as a "nitrogen atom proportion") relative to the sum of the numbers of the carbon atoms, the nitrogen atoms, the oxygen atoms, and the fluorine atoms measured by X-ray photoelectron spectroscopy in a region 5 to 90 nm deep from the surface of the uneven structure, the local maximum being 0.3 atom % or more greater than the average value in a region 90 to 120 nm deep from the surface of the uneven structure. In order to stably achieve excellent antifouling properties (especially, oil repellency), the polymer layer 3 has at least one local maximum that is preferably 0.5 atom % or more, more preferably 1.1 atom % or more, greater than the average value. In other words, the uneven structure has a region where nitrogen atoms are concentrated below (on the side close to the substrate 2 of) the region where fluorine atoms are concentrated on the surface thereof.

Since the antifouling film 1 has both a region where fluorine atoms are concentrated and a region where nitrogen atoms are concentrated, it has significantly improved antifouling properties in comparison with those having only a region where fluorine atoms are concentrated.

The X-ray photoelectron spectroscopy is performed at an X-ray beam diameter of 100 µm, an analysis area of 1000 µm×500 µm, and a photoelectron take-off angle of 45°. The measured value in a region apart from the surface of the uneven structure in the depth direction by a predetermined distance is obtainable by sputtering (etching) of the uneven structure using a gas cluster ion beam (GCIB) and the following X-ray photoelectron spectroscopy measurement (GCIB-XPS).

In the polymer layer 3, the nitrogen atom proportion on the surface of the uneven structure is preferably 1 atom % or more, more preferably 1.6 atom % or more, smaller than the local maximum. This leads to a further increased nitrogen atom proportion in the region where nitrogen atoms are concentrated, further improving the antifouling properties.

In order to achieve the antifouling properties, the antifouling film 1 preferably has a surface that shows a contact angle of 130° or greater with water. Further, the antifouling film 1 preferably has a surface that shows a contact angle of 30° or greater with hexadecane.

The antifouling film 1 may be applied to any use that utilizes excellent antifouling properties thereof, and may be applied to the use as an optical film such as an antireflection film. Such an antireflection film contributes to improvement of the visibility when attached to the inside or outside of a display device.

The antifouling film 1 may be produced by any of the following methods, for example.

<Method 1>

Figure 3:
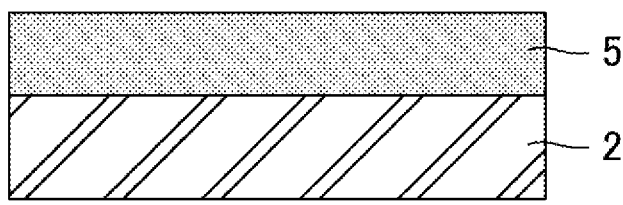
FIG. 3 includes schematic cross-sectional views illustrating Method 1 of producing the antifouling film of the embodiment.
Figure 3:
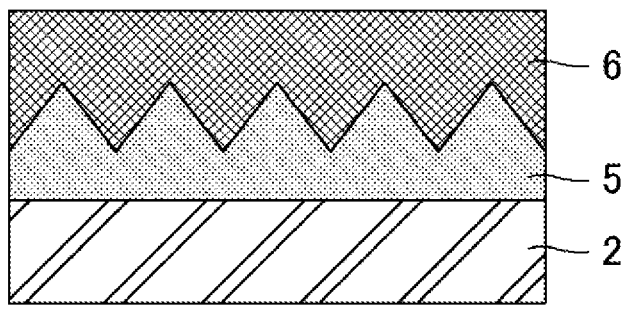
Figure 3:
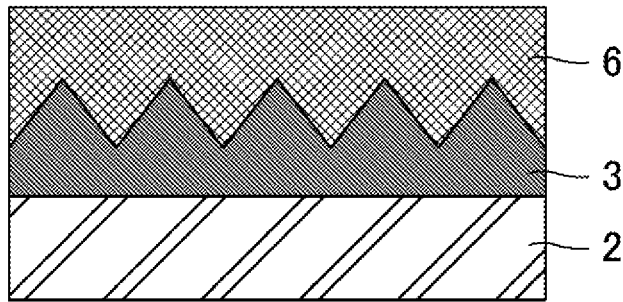
Figure 3:
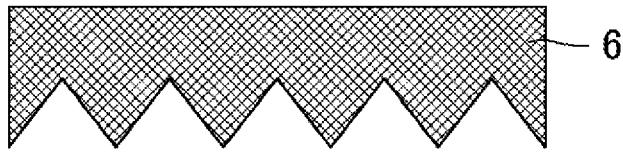
Figure 3:
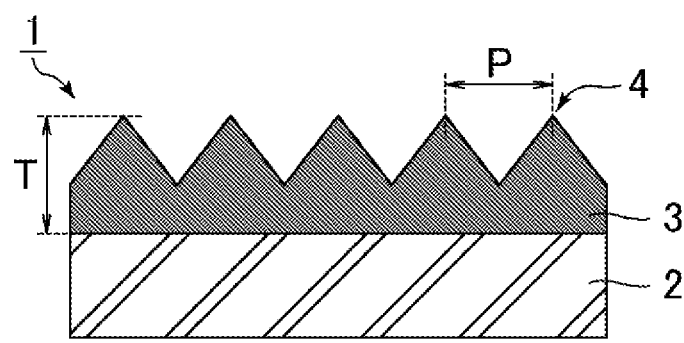

FIG. 3 includes schematic cross-sectional views illustrating Method 1 of producing the antifouling film of the embodiment.

(Process (1): Application of Resin)

As shown in FIG. 3(*a*), the resin 5 is applied to a surface of the substrate 2.

Examples of techniques of applying the resin 5 include spray coating, gravure coating, slot-die coating, and bar coating. In order to level the thickness of the film and to improve the productivity, the method of applying the resin 5 is preferably an application method utilizing gravure coating or slot-die coating.

(Process (2): Formation of Uneven Structure)

As shown in FIG. 3(*b*), the substrate 2 is pushed to a die 6 with the resin 5 in between. As a result, the uneven structure is formed on the surface (the surface opposite to the substrate 2) of the resin 5.

(Process (3): Curing of Resin)

The resin 5 having the uneven structure on the surface thereof is cured. As a result, as shown in FIG. 3(*c*), the polymer layer 3 is formed. In other words, the polymer layer 3 is a cured product of the resin 5.

Examples of the method of curing the resin 5 include application of active energy rays and heating, and a method utilizing application of active energy rays is preferred. The active energy rays herein mean ultraviolet rays, visible light, infrared rays, plasma, or the like. The resin 5 is preferably one that is curable by ultraviolet rays. Application of active energy rays to the resin 5 may be performed from the substrate 2 side of the resin 5, or may be performed from the die 6 side of the resin 5. Application of active energy rays to the resin 5 may be performed once or may be performed multiple times. Curing of the resin 5 (Process (3)) may be performed simultaneously with the aforementioned formation of the uneven structure on the resin 5 (Process (2)).

(Process (4): Release of Die)

As shown in FIG. 3(*d*), the die 6 is released from the polymer layer 3. As a result, the antifouling film 1 is completed.

In the aforementioned production process, Processes (1) to (4) can be continuously and efficiently performed if the substrate 2 is in the form of a roll.

Next, the resin 5 and the die 6 used in Method 1 are described below.

(Resin 5)

The resin 5 contains an antifouling agent and a curable resin.

The antifouling agent contains as an active component a fluorine-containing monomer containing a reactive group (hereinafter, also referred to simply as a fluorine-containing monomer). In other words, the antifouling agent is a fluorine-based antifouling agent. Such a structure leads to a low surface free energy of the polymer layer 3, and thus improves the antifouling properties. Further, fluorine atoms are distributed on the surface (the surface opposite to the substrate 2) of the polymer layer 3, and thus improve the smoothness. As a result, the rubbing resistance is improved. The reactive group as used herein means a functional group reactive with another component in the presence of external energy such as light or heat. Examples of such a reactive group include alkoxysilyl groups, silyl ether groups, silanol groups obtainable by hydrolysis of alkoxysilyl groups, a carboxy group, a hydroxy group, an epoxy group, a vinyl group, an allyl group, an acryloyl group, and a methacryloyl group. In order to achieve good reactivity and handleability, the reactive group is preferably an alkoxysilyl group, a silyl ether group, a silanol group, an epoxy group, a vinyl group, an allyl group, an acryloyl group, or a methacryloyl group, more preferably a vinyl group, an allyl group, an acryloyl group, or a methacryloyl group, still more preferably an acryloyl group or a methacryloyl group.

In addition to the reactive group, the fluorine-containing monomer preferably contains a moiety containing at least one selected from the group consisting of fluoroalkyl groups, fluorooxyalkyl groups, fluoroalkenyl groups, fluoroalkanediyl groups, and fluorooxyalkanediyl groups. Fluoroalkyl groups, fluorooxyalkyl groups, fluoroalkenyl groups, fluoroalkanediyl groups, and fluorooxyalkanediyl groups are substituents in which at least one of the hydrogen atoms is replaced by a fluorine atom respectively in alkyl groups, oxyalkyl groups, alkenyl groups, alkanediyl groups, and oxyalkanediyl groups. Fluoroalkyl groups, fluorooxyalkyl groups, fluoroalkenyl groups, fluoroalkanediyl groups, and fluorooxyalkanediyl groups are substituents mainly containing fluorine atoms and carbon atoms. The structure of each group may have a branch, and multiple of these substituents may be linked with each other.

An example of the fluorine-containing monomer is one represented by the following formula (A):

$$R^{f1}—R^2-D^1 \quad \quad (A)$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is a reactive group.

Examples of the fluorine-containing monomer represented by the formula (A) include 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxybutyl-2-hydroxypropyl acrylate, 2-perfluoro-5-methylhexylethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutylethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecylethyl methacrylate, 2-perfluoro-3-methylbutylethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctylethyl methacrylate, 3-perfluoro-7-methyloctylethyl methacrylate, tetrafluoropropyl methacrylate, octafluoropentyl methacrylate, dodecafluoroheptyl methacrylate, hexadecafluorononyl methacrylate, 1-trifluoromethyltrifluoroethyl methacrylate, hexafluorobutyl methacrylate, and triacryloyl-heptadecafluorononenyl-pentaerythritol.

An example of a material of the fluorine-containing monomer is preferably a material having a fluoropolyether moiety. The fluoropolyether moiety is a moiety formed of a fluoroalkyl group, an oxyfluoroalkyl group, an oxyfluoroalkyldiyl group, or the like, and is a structure typified by the following formula (B) or (C):

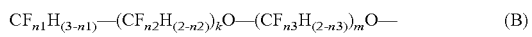

$CF_{n1}H_{(3-n1)}$—$(CF_{n2}H_{(2-n2)})_k$O—$(CF_{n3}H_{(2-n3)})_m$O— (B)

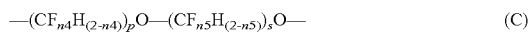

—$(CF_{n4}H_{(2-n4)})_p$O—$(CF_{n5}H_{(2-n5)})_s$O— (C)

wherein n1 is an integer of 1 to 3; n2 to n5 are each 1 or 2; and k, m, p, and s are each an integer of 0 or greater. A preferred combination of n1 to n5 is such that n1 is 2 or 3 and n2 to n5 are each 1 or 2. A more preferred combination is such that n1 is 3, n2 and n4 are 2, and n3 and n5 are 1 or 2.

The fluoropolyether moiety preferably has a carbon number of 4 or more and 12 or less, more preferably 4 or more and 10 or less, still more preferably 6 or more and 8 or less. If the carbon number is less than 4, the surface free energy may unfortunately be low. If the carbon number is more than 12, the solubility in a solvent may unfortunately be low. The fluorine-containing monomer may contain multiple fluoropolyether moieties per molecule.

Known examples of the fluorine-containing monomer include "Optool® DAC" (disclosed in Patent Literature 3, [0053] to [0055]) from Daikin Industries, Ltd., "Optool DAC-HP" from Daikin Industries, Ltd., "CHEMINOX® FAAC-6" (disclosed in Patent Literature 4) from Unimatec Corp., "Afluid" from Asahi Glass Co., Ltd., "Megaface® RS-76-NS" from DIC Corp., "Megaface RS-75" from DIC Corp., "C10GACRY" from Yushiseihin Co., Ltd., "C8HGOL" from Yushiseihin Co., Ltd., and "Fomblin® MT70" from Solvay (disclosed in Patent Literature 5, [0055] to [0058]). The fluorine-containing monomer is preferably one that is curable (polymerizable) by ultraviolet rays. The fluorine-containing monomer preferably contains one or both of the —OCF$_2$— chain and the =NCO— chain. The antifouling agent may contain one or multiple of these fluorine-containing monomers.

In addition to the fluorine-containing monomer, the antifouling agent may appropriately contain other components such as a fluorosurfactant and a reactive monomer.

Known examples of the fluorosurfactant include "Surflon®" from AGC Seimi Chemical Co., Ltd., "Ftergent® 650A" from Neos Co., Ltd., "FC-4430" from 3M, "FC-4432" from 3M, "EFTOP" from Mitsubishi Materials Electronic Chemicals Co., Ltd., and "Megaface R-43" from DIC Corp. The fluorosurfactant may be one that is curable (polymerizable) by ultraviolet rays. The fluorosurfactant preferably contains one or both of the —OCF$_2$— chain and the =NCO— chain. The antifouling agent may contain one or multiple of these fluorosurfactants.

Examples of the reactive monomer include amide-containing monomers such as N-acryloylmorpholine, N-(2-hydroxyethyl) acrylamide, and N,N-diethylacrylamide; hydroxy-containing monomers such as 1,4-cyclohexanedimethanol monoacrylate and 4-hydroxybutyl acrylate; and acetacetoxy-containing monomers such as 2-acetacetoxyethyl methacrylate. A known example of N-acryloylmorpholine is "ACMO®" from KJ Chemicals Corp. A known example of N-(2-hydroxyethyl)acrylamide is "HEAA®" from KJ Chemicals Corp. A known example of N,N-diethylacrylamide is "DEAA®" from KJ Chemicals Corp. A known example of 1,4-cyclohexanedimethanol monoacrylate is "CHDMMA" from Nippon Kasei Chemical Co., Ltd. A known example of 4-hydroxybutyl acrylate is "4HBA" from Nippon Kasei Chemical Co., Ltd. A known example of 2-acetacetoxyethyl methacrylate is "AAEM" from Nippon Synthetic Chemical Industry Co., Ltd. The antifouling agent may contain one or multiple of these reactive monomers. These reactive monomers preferably contain an acid amide bond in the molecule.

The resin 5 contains the active component of the antifouling agent in an amount of preferably 0.1 wt % or more and 10 wt % or less, more preferably 0.5 wt % or more and 9 wt % or less, still more preferably 1 wt % or more and 5 wt % or less. If the active component content of the antifouling agent in the resin 5 is less than 0.1 wt %, the amount of the active component of the antifouling agent on the surface (the surface opposite to the substrate 2) of the polymer layer 3 may be too small, which may unfortunately cause poor antifouling properties. If the active component content of the antifouling agent in the resin 5 is more than 10 wt %, the amount of the active component of the antifouling agent on the surface (the surface opposite to the substrate 2) of the polymer layer 3 may be too large. This may unfortunately cause poor elasticity of the polymer layer 3 (projections 4), and projections 4 fallen by rubbing the surface (the surface opposite to the substrate 2) of the polymer layer 3 may fail to rise (restore) again. As a result, the rubbing resistance may be poor.

The curable resin contains components such as various monomers and a polymerization initiator.

Examples of the various monomers include urethane acrylate, ethoxylated polyglycerin polyacrylate, ethoxylated pentaerythritol tetraacrylate, and dipentaerythritol hexaacrylate. known examples of the urethane acrylate include "U-10HA" from Shin Nakamura Chemical Co., Ltd., "UA-7100" from Shin Nakamura Chemical Co., Ltd., "U-4HA" from Shin Nakamura Chemical Co., Ltd., "UA-510H" from Kyoeisha Chemical Co., Ltd., "UA-306H" from Kyoeisha Chemical Co., Ltd., and "AH-600" from Kyoeisha Chemical Co., Ltd. A known example of the ethoxylated polyglycerin polyacrylate is "NK ECONOMER® A-PG5027E" from Shin Nakamura Chemical Co., Ltd. A known example of the ethoxylated pentaerythritol tetraacrylate is "ATM-35E" from Shin Nakamura Chemical Co., Ltd. A known example of the dipentaerythritol hexaacrylate is "Light Acrylate DPE-6A" from Kyoeisha Chemical Co., Ltd. The curable resin may contain one or multiple of these monomers.

The polymerization initiator may be a photo-polymerization initiator, for example. The photo-polymerization initiator is active to active energy rays, and is added so as to initiate a polymerization reaction for polymerizing the monomers.

Examples of the photo-polymerization initiator include radical polymerization initiators, anionic polymerization initiators, and cationic polymerization initiators. Examples of such a photo-polymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; benzyl ketals such as benzyl dimethyl ketal and hydroxycyclohexyl phenyl ketone; acylphosphine oxides such as 2,4,6-trimethylbenzoyl-diphenyl-phosphine oxide and bis(2,4,6-trimethylbenzoyl)-phenylphosphine oxide; and alkylphenones such as 1-hydroxy-cyclohexyl-phenyl-ketone. A known example of 2,4,6-trimethylbenzoyl-diphenyl-phosphine oxide is "IRGACURE® TPO" from BASF SE. A known example of bis(2,4,6-trimethylbenzoyl)-phenylphosphine oxide is "IRGACURE 819" from BASF SE. A known example of 1-hydroxy-cyclohexyl-phenyl-ketone is "IRGACURE 184" from BASF SE. The curable resin may contain one or multiple of these photo-polymerization initiators.

The curable resin preferably contains a compatible monomer that is compatible with the antifouling agent. This structure allows the active component of the antifouling agent to be uniformly distributed on the surface (the surface opposite to the substrate 2) of the polymer layer 3, possibly improving the antifouling properties. Further, the compatible monomer can improve the adhesion between the curable resin and the antifouling agent, possibly improving the rubbing resistance. Furthermore, occurrence of cloudiness can be prevented even if the resin 5 contains a large amount of the antifouling agent.

Examples of the compatible monomer include N-acryloylmorpholine (e.g., "ACMO" from KJ Chemicals Corp.), N,N-diethylacrylamide (e.g., "DEAA" from KJ Chemicals Corp.), N,N-dimethylacrylamide (e.g., "DMAA®" from KJ Chemicals Corp.), tetrahydrofuran acrylate (e.g., "Viscoat #150" from Osaka Organic Chemical Industry Ltd.), cyclic trimethylolpropane formal acrylate (e.g., "Viscoat #200" from Osaka Organic Chemical Industry Ltd.), and 4-hydroxybutyl acrylate (e.g., "4HBA" from Nippon Kasei Chemical Co., Ltd.). The compatible monomer is preferably a monofunctional monomer containing a polar group such as an amide group, an ether group, or a hydroxy group. The curable resin may contain one or multiple of these compatible monomers.

The curable resin contains the compatible monomer in an amount of preferably 5 wt % or more and 30 wt % or less, more preferably 10 wt % or more and 25 wt % or less, still more preferably 15 wt % or more and 25 wt % or less. If the compatible monomer content in the curable resin is less than 5 wt %, the antifouling properties and the rubbing resistance may unfortunately be poor, especially in a high-temperature/high-humidity environment. If the compatible monomer content in the curable resin is more than 30 wt %, the polymer layer 3 may have a low crosslinking density and a strong cohesive force between bonds, so that the polymer layer 3 may have high hardness. This may unfortunately cause poor rubbing resistance, especially in a high-temperature/high-humidity environment.

The resin 5 may or may not contain a solvent, and preferably contains no solvent. In other words, the resin 5 is preferably a solvent-free resin. The solvent-free resin enables reduction in the cost relating to the use of a solvent and in environmental load (e.g., bad odor in use). Further, this configuration eliminates the need for a device for removing a solvent, enabling reduction in the cost relating to such a device. In contrast, if the resin 5 contains a solvent, the antifouling agent may be mixed excessively, so that the fluorine atom concentration on the surface (the surface opposite to the substrate 2) of the polymer layer 3 may be low. Further, such a resin 5 may have high volatility, so that the ease of application thereof may unfortunately be poor.

Examples of the solvent include alcohols (carbon number: 1 to 10, e.g., methanol, ethanol, n- or i-propanol, n-, sec-, or t-butanol, benzyl alcohol, and octanol), ketones (carbon number: 3 to 8, e.g., acetone, methyl ethyl ketone, methyl isobutyl ketone, diisobutyl ketone, dibutyl ketone, and cyclohexanone), esters or ether esters (carbon number: 4 to 10, e.g., ethyl acetate, butyl acetate, and ethyl lactate), γ-butyrolactone, ethylene glycol monomethyl acetate, propylene glycol monomethyl acetate, ethers (carbon number: 4 to 10, e.g., EG monomethyl ether (methyl cellosolve), EG monoethyl ether (ethyl cellosolve), diethylene glycol monobutyl ether (butyl cellosolve), and propylene glycol monomethyl ether), aromatic hydrocarbons (carbon number: 6 to 10, e.g., benzene, toluene, and xylene), amides (carbon number: 3 to 10, e.g., dimethylformamide, dimethylacetamide, and N-methylpyrrolidone), halogenated hydrocarbons (carbon number: 1 or 2, e.g., methylene dichloride and ethylene dichloride), and petroleum-based solvents (e.g., petroleum ether and petroleum naphtha). The resin 5 may contain one or multiple of these solvents.

(Die 6)

The die 6 may be one produced by the following method. First, a film of aluminum that is a material of the die 6 is formed on a surface of a support by sputtering. Next, the resulting aluminum layer is repetitively subjected to anodizing and etching. Thereby, a cavity (die 6) of the moth-eye structure can be produced. At this time, the uneven structure of the die 6 can be modified by adjusting the duration of the anodizing and the duration of the etching.

Examples of a material of the support include glass; metal materials such as stainless steel and nickel; polyolefinic resins such as polypropylene, polymethylpentene, and cyclic olefinic polymers (typified by norbornene-based resin, e.g., "Zeonor®" from Zeon Corp., "Arton®" from JSR Corp.); polycarbonate resin; and resin materials such as polyethylene terephthalate, polyethylene naphthalate, and triacetyl cellulose. Instead of the support with an aluminum film formed on the surface, an aluminum support may be used.

The die 6 may have a shape of a flat plate or a roll, for example.

The surface of the die 6 preferably has undergone release treatment with a release agent. Thereby, the die 6 can be easily removed from the polymer layer 3. Further, this treatment makes the surface free energy of the die 6 low, and thus the active component of the antifouling agent can efficiently be distributed on the surface (the surface opposite to the substrate 2) of the resin 5 when the substrate 2 is pushed to the die 6 in Process (2). Further, this treatment can prevent early removal of the active component of the antifouling agent from the surface (the surface opposite to the substrate 2) of the resin 5 before curing of the resin 5. As a result, in the antifouling film 1, the active component of the antifouling agent can efficiently be distributed on the surface (the surface opposite to the substrate 2) of the polymer layer 3.

Examples of the release agent used in the release treatment for the die 6 include fluorine-based release agents, silicone-based release agents, and phosphate-ester-based release agents. Known examples of the fluorine-based release agents include "Optool DSX" from Daikin Industries, Ltd. and "Optool AES4" from Daikin Industries, Ltd.

<Method 2>

Figure 4:
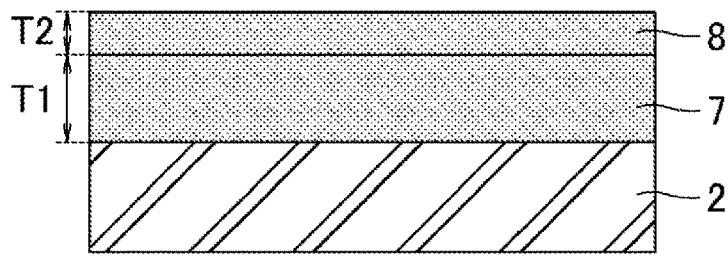
FIG. 4 includes schematic cross-sectional views illustrating Method 2 of producing the antifouling film of the embodiment.
Figure 4:
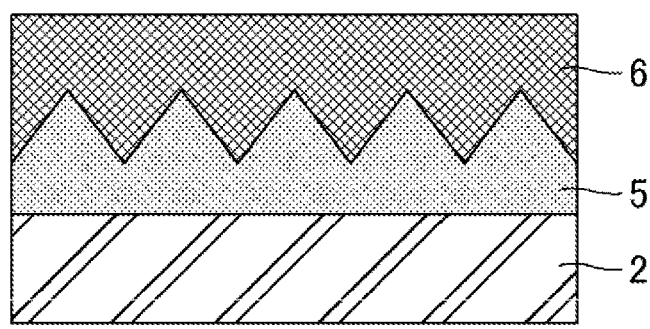
Figure 4:
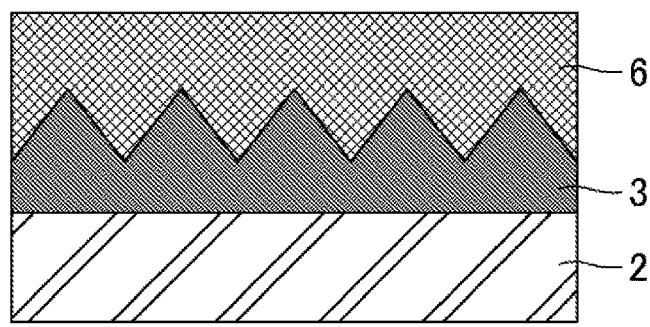
Figure 4:
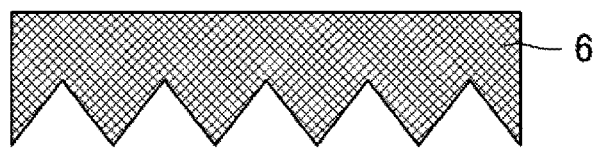
Figure 4:
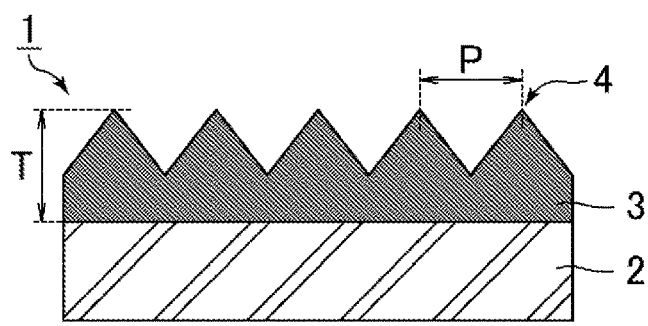

FIG. 4 includes schematic cross-sectional views illustrating Method 2 of producing the antifouling film of the embodiment. Method 2 is the same as Method 1, except that the antifouling agent and the curable resin are applied in separate two layers and then integrated with each other. Thus, descriptions of the same features are omitted as appropriate.

(Process (1): Application of First Resin and Second Resin)

As shown in FIG. 4(a), a first resin 7 containing a curable resin is applied to a surface of the substrate 2. Next, a second resin 8 containing an antifouling agent is applied to the surface (the surface opposite to the substrate 2) of the first resin 7 applied.

Examples of techniques of applying the first resin 7 and the second resin 8 include spray coating, gravure coating, slot-die coating, and bar coating. In order to level the thickness of the film applied, the method of applying the first resin 7 is preferably gravure coating or slot-die coating. In order to adjust the thickness easily and to reduce the device cost, the method of applying the second resin 8 is preferably spray coating. Particularly preferred is application using a swirl nozzle, an electrostatic nozzle, or an ultrasonic nozzle.

The first resin 7 and the second resin 8 may be applied either non-simultaneously or simultaneously. An example of a method of applying the first resin 7 and the second resin 8 simultaneously is co-extruding application.

(Process (2): Formation of Resin)

As shown in FIG. 4(b), the substrate 2 is pushed to the die 6 such that the first resin 7 side thereof faces the die 6 with the first resin 7 and the second resin 8 in between. As a result, the resin 5 having an uneven structure on the surface (the surface opposite to the substrate 2) is formed. In the resin 5, the first resin 7 and the second resin 8 are integrated with each other and no interface exists between the resins.

(Process (3): Curing of Resin)

The resin 5 having the uneven structure on the surface thereof is cured. As a result, as shown in FIG. 4(c), the polymer layer 3 is formed.

(Process (4): Release of Die)

As shown in FIG. 4(d), the die 6 is released from the polymer layer 3. As a result, the antifouling film 1 is completed.

In Method 2, since the second resin 8 that mainly constitutes the surface (the surface opposite to the substrate 2) of the resin 5 contains the antifouling agent, the active component of the antifouling agent is likely to be distributed on the surface (the surface opposite to the substrate 2) of the resin 5.

Neither the first resin 7 nor the second resin 8 preferably contains a solvent. In other words, the first resin 7 and the second resin 8 are preferably of solvent-free. Such a configuration enables reduction in the cost relating to the use of a solvent and in environmental load (e.g., bad odor in use). Further, this configuration eliminates the need for a device for removing a solvent, enabling reduction in the cost relating to such a device.

The thickness T1 of the first resin 7 is preferably 3 μm or greater and 30 μm or smaller, more preferably 5 μm or greater and 7 μm or smaller.

The thickness T2 of the second resin 8 is preferably 0.1 μm or greater and 15 μm or smaller, more preferably 1 μm or greater and 10 μm or smaller, still more preferably 2 μm or greater and 8 μm or smaller, particularly preferably 5 μm or greater and 8 μm or smaller.

<Method 3>

Figure 5:
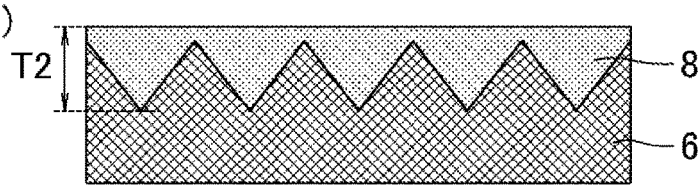
FIG. 5 includes schematic cross-sectional views illustrating Method 3 of producing the antifouling film of the embodiment.
Figure 5:
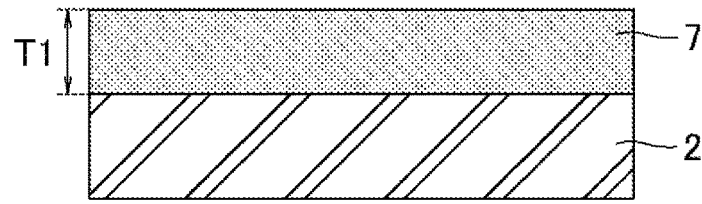
Figure 5:
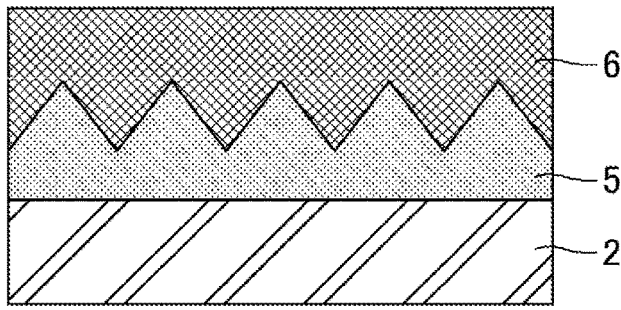
Figure 5:
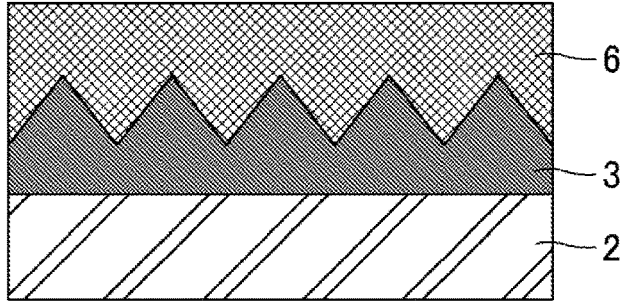
Figure 5:
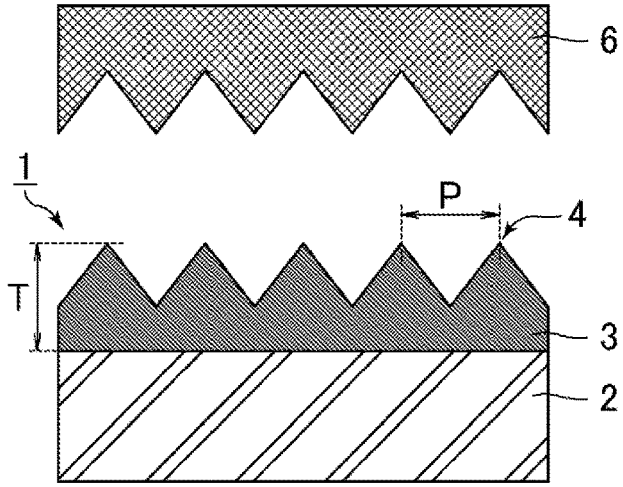

FIG. 5 includes schematic cross-sectional views illustrating Method 3 of producing the antifouling film of the embodiment. Method 3 is the same as Method 2, except that the second resin is applied to the surface of a die. Thus, descriptions of the same features are omitted as appropriate.

(Process (1): Application of First Resin and Second Resin)

As shown in FIG. 5(a), the first resin 7 containing a curable resin is applied to a surface of the substrate 2. Next, the second resin 8 containing an antifouling agent is applied to the surface (uneven surface) of the die 6.

The first resin 7 and the second resin 8 may be applied either non-simultaneously or simultaneously.

(Process (2): Formation of Resin)

As shown in FIG. 5(b), the substrate 2 is pushed to the die 6 such that the first resin 7 side thereof faces the die 6 with the first resin 7 and the second resin 8 in between. As a result, the resin 5 having an uneven structure on the surface (the surface opposite to the substrate 2) is formed.

(Process (3): Curing of Resin)

The resin 5 having the uneven structure on the surface thereof is cured. As a result, as shown in FIG. 5(c), the polymer layer 3 is formed.

(Process (4): Release of Die)

As shown in FIG. 5(d), the die 6 is released from the polymer layer 3. As a result, the antifouling film 1 is completed.

For Process (1), in Methods 2 and 3, the first resin 7 is applied to a surface of the substrate 2 and the second resin 8 is applied to a surface of the first resin 7 or the die 6. Still, the second resin 8 may be applied to both a surface of the first resin 7 and a surface of the die 6. In other words, Process (1) may be performed such that the first resin 7 is applied to a surface of the substrate 2 and the second resin 8 is applied to one or both of a surface of the first resin 7 and a surface of the die 6. Alternatively, Process (1) may be performed such that the second resin 8 is applied to the surface (uneven surface) of the die 6 and the first resin 7 is applied to the surface (the surface opposite to the die 6) of the second resin 8.

Examples and Comparative Examples

Hereinafter, the present invention is described in more detail based on examples and comparative examples. The examples, however, are not intended to limit the scope of the present invention.

The materials used for producing the antifouling films in the examples and comparative examples were as follows.

(Substrate 2)

"Fujitac® TD-60" from Fujifilm Corp. was used. The thickness thereof was 60 μm.

(Resin 5)

Resins A1 to A10 having the respective compositions as shown in Table 1 and Table 2 were used. The abbreviations of the materials of the respective resins are as follows. Table 1 and Table 2 also show the active component contents of the antifouling agents in the respective resins. The active component in the antifouling agent means a compound containing a fluorine atom in the molecule.

<Antifouling Agent>

The following antifouling agents F1 to F7 were used.

(1) Antifouling Agent F1

"Optool DAC" from Daikin Industries, Ltd.: 40 wt %
"ACMO" from KJ Chemicals Corp.: 60 wt %
The active component content in Antifouling Agent F1 was 40 wt %.

(2) Antifouling Agent F2

"Optool DAC-HP" from Daikin Industries, Ltd.: 100 wt %
The active component content in Antifouling Agent F2 was 20 wt %.

(3) Antifouling Agent F3

"Optool DAC" from Daikin Industries, Ltd.: 10 wt %
"ACMO" from KJ Chemicals Corp.: 40 wt %
"Megaface R-43" from DIC Corp.: 50 wt %
The active component content in Antifouling Agent F3 was 10 wt %.

(4) Antifouling Agent F4

Perfluoroalkenyl-containing monomer (disclosed in Patent Literature 6): 20 wt %
"DMAA" from KJ Chemicals Corp.: 80 wt %
The active component content in Antifouling Agent F4 was 20 wt %.

(5) Antifouling Agent F5

"Fomblin® MT70" from Solvay: 100 wt %
The active component content in Antifouling Agent F5 was 80 wt %.

(6) Antifouling Agent F6

"CHEMINOX FAAC-6" from Unimatec Corp.: 100 wt %
The active component content in Antifouling Agent F6 was 100 wt %.

(7) Antifouling Agent F7

"Megaface RS-76-NS" from DIC Corp.: 20 wt %
Dipropylene glycol diacrylate: 80 wt %
The active component content in Antifouling Agent F7 was 20 wt %.

<Curable Resin>

The following monomers and polymerization initiators were used as the materials of the curable resins.

(1) Monomer

UA: "UA-510H" from Kyoeisha Chemical Co., Ltd.
ATM: "ATM-35E" from Shin Nakamura Chemical Co., Ltd.
DPE: "Light Acrylate DPE-6A" from Kyoeisha Chemical Co., Ltd.
DM: "DMAA" from KJ Chemicals Corp.

(2) Polymerization initiator

"819": "IRGACURE 819" from BASF SE

TABLE 1

| | | | Resin | | | | |
|---|---|---|---|---|---|---|---|
| Type | | Name | A1 | A2 | A3 | A4 | A5 |
| Composition (wt %) | Antifouling agent | F1 | 2.5 | 5 | 7.5 | 12.5 | — |
| | | F2 | — | — | — | — | 25 |
| | | F3 | — | — | — | — | — |

TABLE 1-continued

| | | | Resin | | | | |
|---|---|---|---|---|---|---|---|
| Type | | Name | A1 | A2 | A3 | A4 | A5 |
| | | F4 | — | — | — | — | — |
| | | F5 | — | — | — | — | — |
| | | F6 | — | — | — | — | — |
| | | F7 | — | — | — | — | — |
| Curable resin | | UA | 8 | 8 | 7.5 | 7 | 6 |
| | | ATM | 45 | 43.5 | 42.5 | 40 | 35 |
| | | DPE | 18.5 | 18 | 17.5 | 16.5 | 14 |
| | | DM | 24 | 23.5 | 23 | 22 | 18 |
| | | 819 | 2 | 2 | 2 | 2 | 2 |
| Active component content of antifouling agent in resin (wt %) | | | 1 | 2 | 3 | 5 | 5 |

TABLE 2

| | | | Resin | | | | |
|---|---|---|---|---|---|---|---|
| Type | | Name | A6 | A7 | A8 | A9 | A10 |
| Composition (wt %) | Antifouling agent | F1 | — | — | — | — | — |
| | | F2 | — | — | — | — | — |
| | | F3 | 50 | — | — | — | — |
| | | F4 | — | 5 | — | — | — |
| | | F5 | — | — | 2.5 | — | — |
| | | F6 | — | — | — | 5 | — |
| | | F7 | — | — | — | — | 25 |
| Curable resin | | UA | 4 | 8 | — | 8 | 6 |
| | | ATM | 22 | 43.5 | 40.5 | 43.5 | 35 |
| | | DPE | 10 | 18 | 30 | 18 | 14 |
| | | DM | 13 | 23.5 | 25 | 23.5 | 18 |
| | | 819 | 1 | 2 | 2 | 2 | 2 |
| Active component content of antifouling agent in resin (wt %) | | | 5 | 1 | 2 | 5 | 5 |

(Die 6)

A die produced by the following method was used. First, a film of aluminum that is a material of the die was formed on a surface of a 10-cm-square glass substrate by sputtering. The thickness of the resulting aluminum layer was 1.0 μm. Next, the resulting aluminum layer was repetitively subjected to anodizing and etching. Thereby, an anodizing layer was formed with many fine pores (distance between the bottom points of adjacent pores (recesses) was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum layer (a tapered shape). As a result, a die having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die was found to have a recess depth of 290 nm by scanning electron microscopic observation. The surface of the die was subjected to release treatment with "Optool AES4" from Daikin Industries, Ltd. in advance.

Example 1

An antifouling film of Example 1 was produced by Method 1.
(Process (1): application of resin)
The resin A1 was applied to a surface of the substrate 2 using a bar coater "No. 02" from Dai-ichi Rika.
(Process (2): formation of uneven structure)
The substrate 2 was pushed to the die 6 with the resin A1 in between using a hand roller. As a result, the uneven structure was formed on the surface (the surface opposite to the substrate 2) of the resin A1.
(Process (3): Curing of Resin)
The resin A1 having the uneven structure on the surface thereof was irradiated with ultraviolet rays (dose: 200 mJ/cm$^2$) from the substrate 2 side, so that the resin A1 was cured. As a result, the polymer layer 3 was formed.
(Process (4): Release of Die)
The die 6 was released from the polymer layer 3. As a result, the antifouling film 1 was completed. The thickness T of the polymer layer 3 was 9.8 µm.
The surface specifications of the antifouling film 1 were as follows.
Shape of projections 4: temple-bell-like shape
Pitch P between adjacent projections 4: 200 nm
Height of projection 4: 200 nm
Aspect ratio of projection 4: 1.0
The surface specifications of the antifouling film 1 were evaluated using a scanning electron microscope "S-4700" from Hitachi High-Technologies Corp. For the evaluation, an osmium metal film of osmium(VIII) oxide (thickness: 5 nm) from Wako Pure Chemical Industries, Ltd. was formed on the surface (the surface opposite to the substrate 2 of the polymer layer 3) of the antifouling film 1 by plasma CVD film formation using an osmium coater "NEOC-AN" from Meiwafosis Co., Ltd. Specifically, the pitch P between adjacent projections 4 was defined as the average value of the distances of all the pairs of adjacent projections except for branched projections within a 1-µm-square region in a plane image taken by the above scanning electron microscope. The height of projection 4 was defined as the average value of the heights of 10 consecutive projections except for branched projections in a cross-sectional image taken by the above scanning electron microscope. It should be noted that 10 projections were selected so as not to include projections having any defect or deformed portion (e.g., a portion accidentally deformed during preparation of a measurement sample).
(Examples 2 to 8 and Comparative Examples 1 and 2)
An antifouling film of each example was produced in the same manner as in Example 1, except that the composition was changed as shown in Table 3 or Table 4.
The antifouling films were evaluated as follows.
(GCIB-XPS Measurement)
For the antifouling films of Examples 1 to 8 and Comparative Examples 1 and 2, the distribution of the constituent atoms in the depth direction of the uneven structure was investigated by GCIB-XPS measurement.
The gas cluster ion beam is an ion beam consisting of several tens to several thousands of atoms and having a very low energy per atom. For example, an argon gas cluster ion beam generates no residual sputtering atom after sputtering of a sample, and thus can achieve ultra-low energy ion etching of about 1 to 20 eV per atom which cannot be achieved by C60 ions. Also, argon gas cluster ions hardly caused a chemical change on the sample surface after sputtering, and thus enable etching on organic matter.

Figure 6:
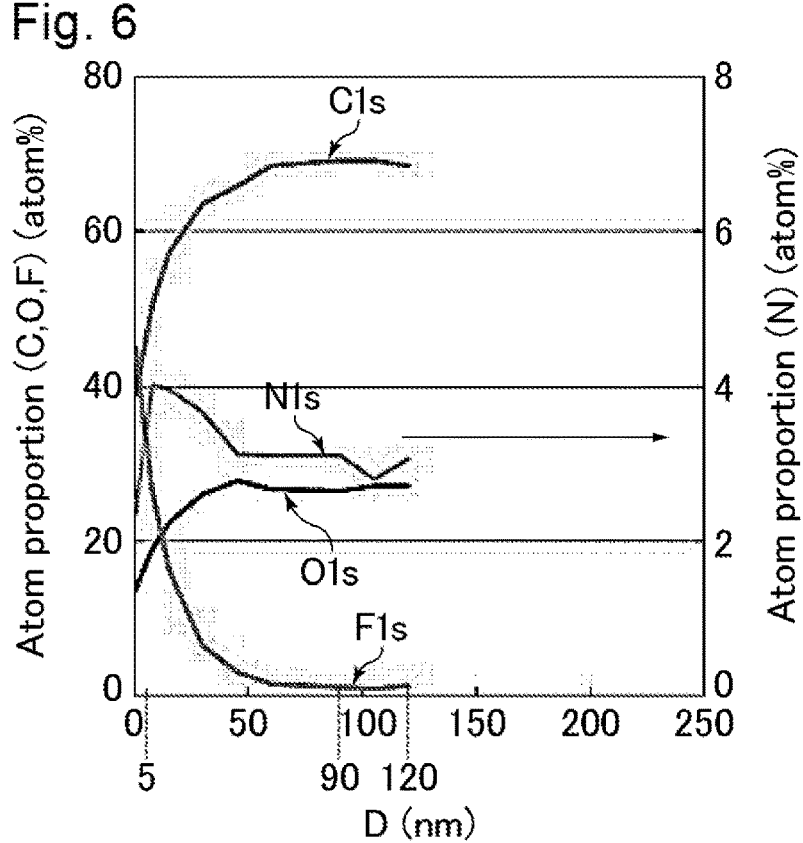
FIG. 6 is a graph showing the results of GCIB-XPS measurement on an antifouling film of Example 2.
Figure 7:
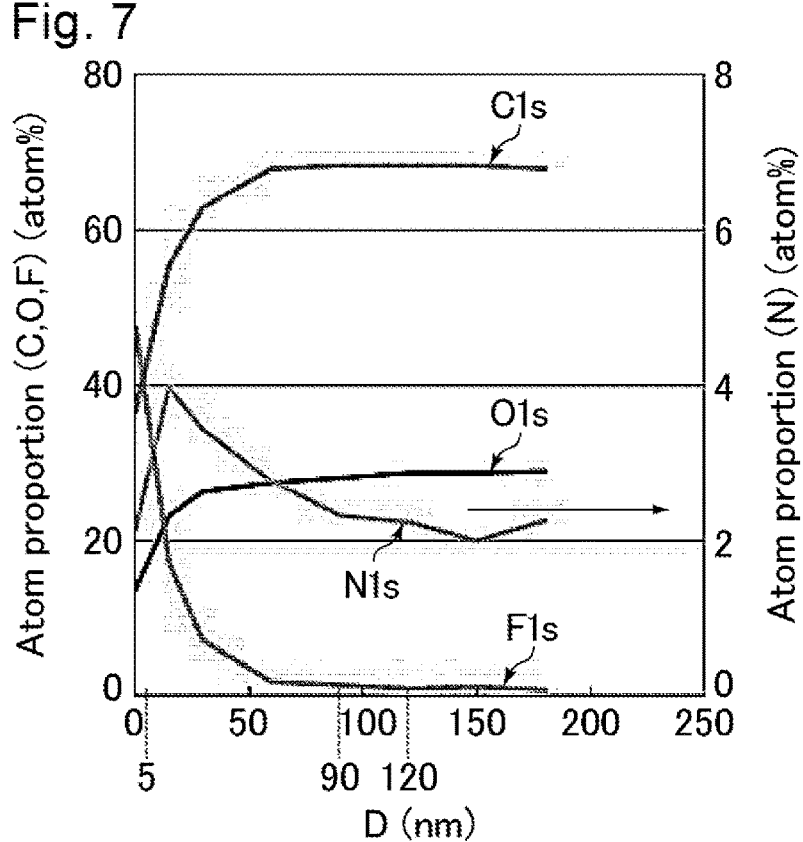
FIG. 7 is a graph showing the results of GCIB-XPS measurement on an antifouling film of Example 5.
Figure 8:
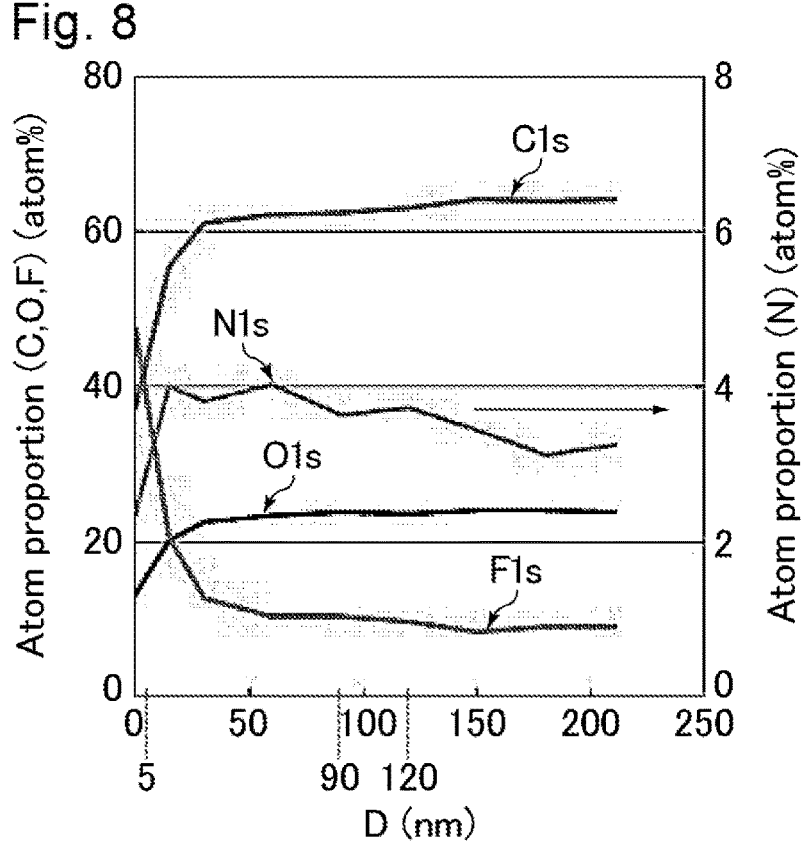
FIG. 8 is a graph showing the results of GCIB-XPS measurement on an antifouling film of Example 6.
Figure 9:
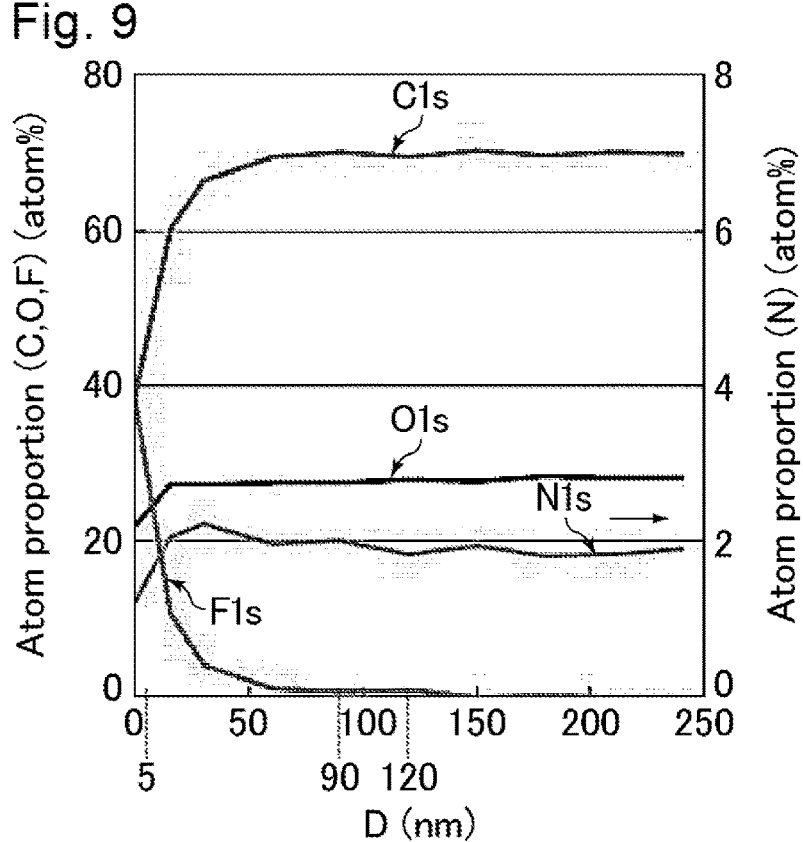
FIG. 9 is a graph showing the results of GCIB-XPS measurement on an antifouling film of Example 7.
Figure 10:
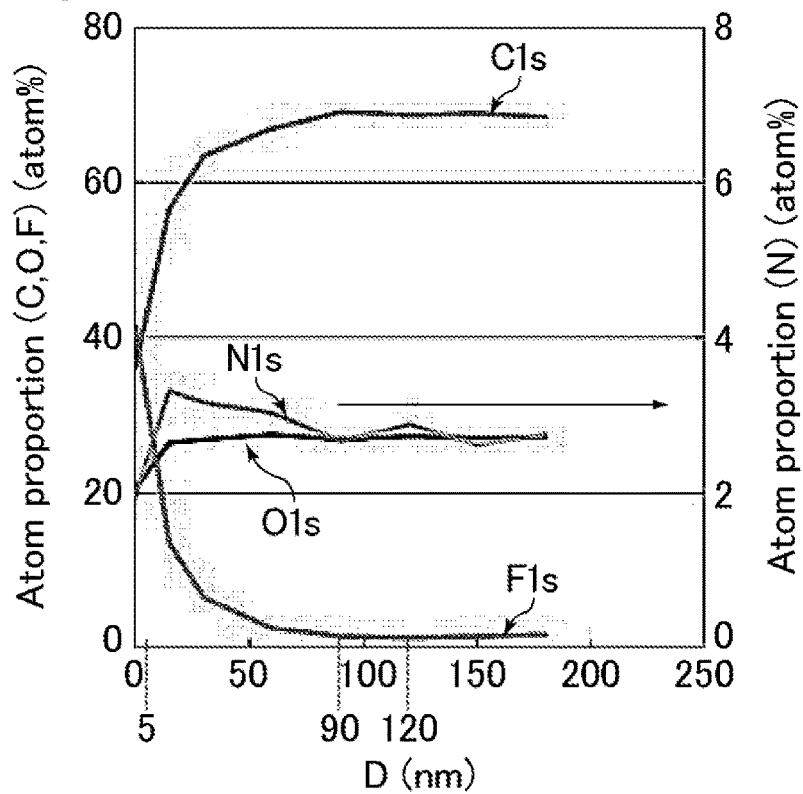
FIG. 10 is a graph showing the results of GCIB-XPS measurement on an antifouling film of Example 8.
Figure 11:
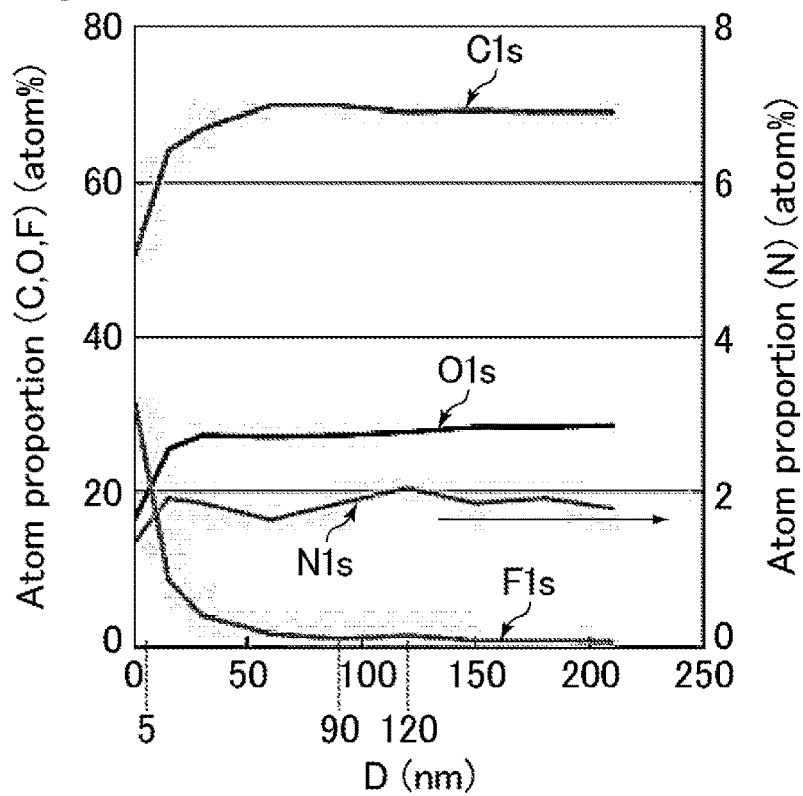
FIG. 11 is a graph showing the results of GCIB-XPS measurement on an antifouling film of Comparative Example 1.
Figure 12:
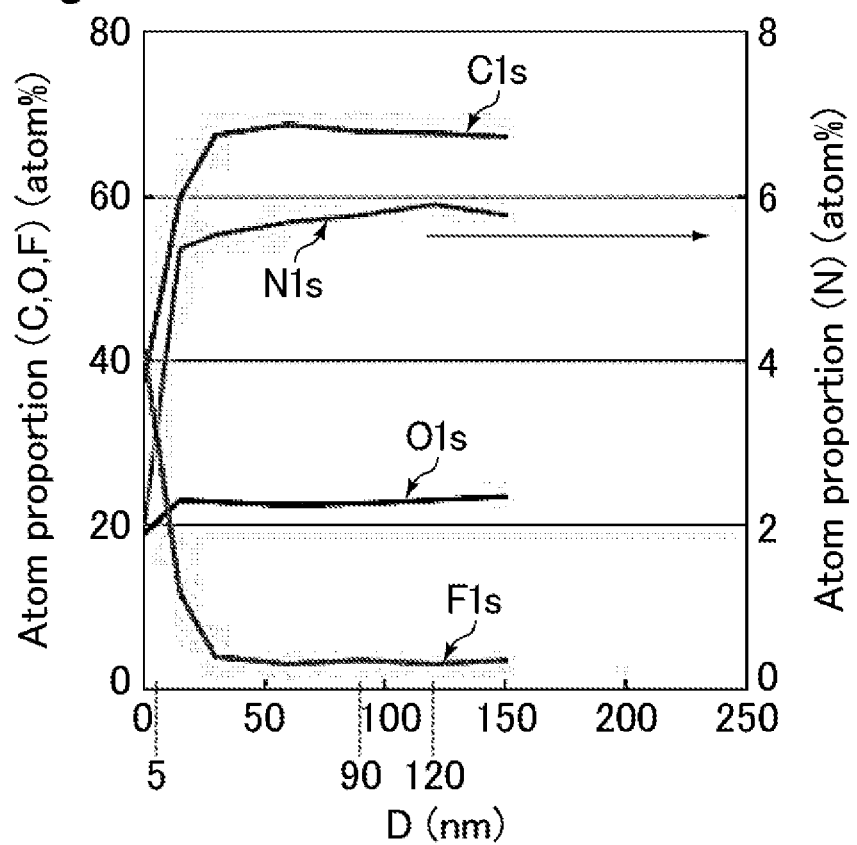
FIG. 12 is a graph showing the results of GCIB-XPS measurement on an antifouling film of Comparative Example 2.

The measurement device used was an X-ray photoelectron spectroscope (trade name: PHI 5000 VersaProbe II) from Ulvac-Phi, Inc. equipped with an argon gas cluster sputtering ion gun (trade name: 06-2000).
The measurement conditions for X-ray photoelectron spectroscopy were as follows.
<Measurement Conditions>
X-ray beam diameter: 100 µm
Analysis area: 1000 µm×500 µm
Photoelectron take-off angle: 45°
Pass energy: 46.95 eV
The conditions for gas cluster ion beam sputtering (etching) and the conditions for charge neutralization were as follows.
<Sputtering Conditions>
Ion source: argon gas cluster ion beam
Accelerating voltage: 10 kV (15 mA Emission)
Zalar rotation speed: 1 rotation/min
Sputtering rate (etching rate): 10 nm/min
<Charge Neutralization Conditions>
Electron gun: Bias 1.0 V (20 µA Emission)
Ion gun: 1 V or 3 V (7 mA Emission)
Based on the data obtained from the GCIB-XPS measurement, the relationship was calculated between the distance from the surface of the uneven structure in the depth direction and the proportion of the number of each atom species relative to the sum of the numbers of the carbon atoms, the nitrogen atoms, the oxygen atoms, and the fluorine atoms in the polymer layer. Typical results of the GCIB-XPS measurement were shown in FIGS. 6 to 12. FIG. 6 is a graph showing the results of GCIB-XPS measurement on an antifouling film of Example 2. FIG. 7 is a graph showing the results of GCIB-XPS measurement on an antifouling film of Example 5. FIG. 8 is a graph showing the results of GCIB-XPS measurement on an antifouling film of Example 6. FIG. 9 is a graph showing the results of GCIB-XPS measurement on an antifouling film of Example 7. FIG. 10 is a graph showing the results of GCIB-XPS measurement on an antifouling film of Example 8. FIG. 11 is a graph showing the results of GCIB-XPS measurement on an antifouling film of Comparative Example 1. FIG. 12 is a graph showing the results of GCIB-XPS measurement on an antifouling film of Comparative Example 2. In FIGS. 6 to 12, the horizontal axis D represents the distance (unit: nm) from the surface of the uneven structure in the depth direction. The vertical axes "Atom proportion" each represent the proportion (unit: atom %) of the number of each atom species relative to the sum of the numbers of the carbon atoms, the nitrogen atoms, the oxygen atoms, and the fluorine atoms.
Also, the following parameters (atom proportions) were calculated. The results are shown in Table 3 and Table 4.
"Fs": the fluorine atom proportion on the surface of the uneven structure
"Ns": the nitrogen atom proportion on the surface of the uneven structure
"Nm": the local maximum of the nitrogen atom proportion in a region 5 to 90 nm deep from the surface of the uneven structure (if multiple local maximums are present, the greatest value among them)
"Na": the average value of the nitrogen atom proportions in a region 90 to 120 nm deep from the surface of the uneven structure
"Nm−Ns": the difference between the local maximum of the nitrogen atom proportion in a region 5 to 90 nm deep from the surface of the uneven structure and the nitrogen atom proportion on the surface of the uneven structure "Nm−Na": the difference between the local maximum of the nitrogen atom proportion in a region 5 to 90 nm deep from the surface of the uneven structure and the average value of the nitrogen atom proportions in a region 90 to 120 nm deep from the surface of the uneven structure (Evaluation of Properties)

For the antifouling films of Examples 1 to 8 and Comparative Examples 1 and 2, the antifouling properties were evaluated. The results are shown in Table 3 and Table 4.

<Antifouling Properties>

For the antifouling properties, the water repellency, the oil repellency, and the ease of wiping off fingerprints were evaluated.

The water repellency was evaluated by the contact angle of water on the surface (the surface opposite to the substrate of the polymer layer) of the antifouling film of each example. Specifically, water was dropped on the surface (the surface opposite to the substrate of the polymer layer) of the antifouling film of each example, and the contact angle thereof was measured immediately after the dropping.

The oil repellency was evaluated by the contact angle of hexadecane on the surface (the surface opposite to the substrate of the polymer layer) of the antifouling film of each example. Specifically, hexadecane was dropped on the surface (the surface opposite to the substrate of the polymer layer) of the antifouling film of each example, and the contact angle was measured immediately after the dropping and 10 seconds thereafter.

The contact angles of water and hexadecane were each the average value of contact angles measured at the following three points by the θ/2 method (θ/2=arctan(h/r), wherein θ: contact angle, r: radius of droplet, h: height of droplet) using a portable contact angle meter "PCA-1" from Kyowa Interface Science Co., Ltd. The first measurement point selected was the central portion of the antifouling film of each example. The second and third measurement points were two points that are 20 mm or more apart from the first measurement point and are point-symmetrical to each other about the first measurement point.

The ease of wiping off fingerprints was evaluated by the following method. First, for the antifouling film of each example, a black acrylic sheet was attached to the surface opposite to the polymer layer of the substrate with an optical adhesive layer in between. Next, the antifouling film of each example was left in an environment at a temperature of 60° C. and a humidity of 95% for 101 days, and further in an environment at a temperature of 23° C. and a humidity of 50% for one day. Then, a fingerprint was left on the surface (the surface opposite to the substrate of the polymer layer) of the antifouling film of each example, and the surface was rubbed 10 reciprocations using "Bemcot® S-2" from Asahi Kasei Fibers Corp. Whether the fingerprint was wiped off or not was visually observed in an environment with an illuminance of 100 1× (fluorescent lamp). The evaluation criteria were as follows.

Good: The fingerprint was completely wiped off and no wiping residue was observed.

Fair: The fingerprint was not obvious, but slight wiping residue was observed when the light from a fluorescent lamp was reflected on the surface.

Poor: The fingerprint was not wiped off at all.

The cases evaluated as good were considered as within the allowable level (having excellent antifouling properties).

TABLE 3

| | | | Example 1 | Example 2 | Example 3 | Example 4 | Example 5 |
|---|---|---|---|---|---|---|---|
| | Resin | | A1 | A2 | A3 | A4 | A5 |
| Atom proportion (atom %) | | Fs | 38.7 | 45.0 | 45.7 | 45.9 | 48.0 |
| | | Ns | 2.7 | 2.4 | 2.0 | 2.1 | 2.2 |
| | | Nm | 4.1 | 4.0 | 4.2 | 4.3 | 4.0 |
| | | Na | 3.1 | 3.0 | 2.9 | 3.2 | 2.3 |
| | | Nm − Ns | 1.4 | 1.6 | 2.2 | 2.2 | 1.8 |
| | | Nm − Na | 1.0 | 1.0 | 1.3 | 1.1 | 1.7 |
| Antifouling properties | Contact angle of water (°) | Immediately after dropping | 158 | 164 | 162 | 164 | 159 |
| | Contact angle of hexadecane (°) | Immediately after dropping | 66 | 84 | 85 | 84 | 86 |
| | | 10 Seconds later | 31 | 66 | 73 | 69 | 75 |
| | Ease of wiping off fingerprints | | Good | Good | Good | Good | Good |

TABLE 4

| | | | Example 6 | Example 7 | Example 8 | Comparative Example 1 | Comparative Example 2 |
|---|---|---|---|---|---|---|---|
| | Resin | | A6 | A7 | A8 | A9 | A10 |
| Atom proportion (atom %) | | Fs | 47.6 | 38.0 | 41.4 | 31.4 | 41.3 |
| | | Ns | 2.4 | 1.2 | 1.9 | 1.4 | 2.0 |
| | | Nm | 4.1 | 2.2 | 3.3 | 1.9 | — |
| | | Na | 3.6 | 1.9 | 2.8 | 2.0 | 5.8 |
| | | Nm − Ns | 1.7 | 1.0 | 1.4 | 0.5 | — |
| | | Nm − Na | 0.5 | 0.3 | 0.5 | −0.1 | — |
| Antifouling properties | Contact angle of water (°) | Immediately after dropping | 160 | 154 | 153 | 164 | 164 |
| | Contact angle of hexadecane (°) | Immediately after dropping | 81 | 20 | 88 | 21 | 67 |
| | | 10 Seconds later | 75 | 14 | 85 | 15 | 19 |
| | Ease of wiping off fingerprints | | Good | Good | Good | Poor | Poor |

As shown in Table 3 and Table 4, the antifouling films of Examples 1 to 8 each had high antifouling properties, especially ease of wiping off fingerprints. In contrast, the antifouling films of Comparative Examples 1 and 2 had high water repellency (a greater contact angle with water) but had poor ease of wiping off fingerprints.

The antifouling films of Examples 1 to 4, 7, and 8 also had good rubbing resistance. Further, they had good adhesion between the substrate and the polymer layer (hereinafter, also simply referred to as adhesion).

<Rubbing Resistance>

The rubbing resistance was evaluated by the following method. First, the surface (the surface opposite to the substrate of the polymer layer) of the antifouling film of each example was rubbed with a tissue a few times. Then, the degree of whitening at the portion rubbed with the tissue was visually observed in a direction forming a small angle with the surface in an environment with an illuminance of 100 1× (under a fluorescent lamp). The evaluation criteria were as follows.

Good: No change occurred (no whitening was observed).
Fair: Slight whitening was observed.
Poor: Obvious whitening was observed.

The cases evaluated as good were considered as within the allowable level (having excellent rubbing resistance).

<Adhesion>

The adhesion was evaluated by the following method. First, 11 vertical cuts and 11 horizontal cuts were made in a grid pattern with 1 mm spacing on the surface (the surface opposite to the substrate of the polymer layer) of the antifouling film of each example using a snap-off utility knife. Thereby, 100 squares (1 mm square) were formed. Then, polyester adhesive tape "No. 31B" from Nitto Denko Corp. was press-applied to the squares and peeled off in the 90° direction relative to the surface of the squares at a rate of 100 mm/s. The state of the polymer layer on the substrate after the peeling was visually observed, and the number of squares in which the polymer layer was not peeled off but left on the substrate was counted.

Figure 13:
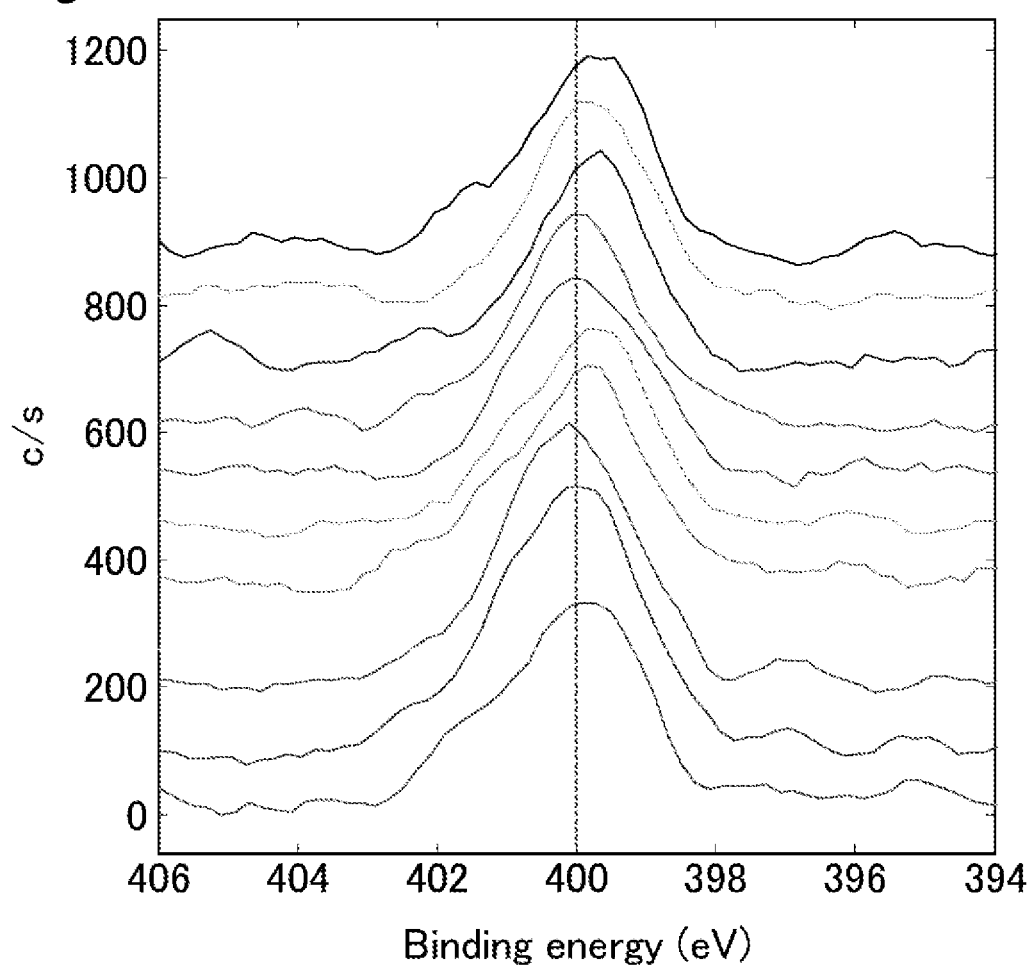
FIG. 13 is a graph showing narrow spectra (N1s peaks) in the depth direction of the uneven structure in the antifouling film of Example 2.

Next, for the antifouling films of the respective examples, the distribution of binding species containing nitrogen atoms in the depth direction of the uneven structure was investigated. Specifically, the narrow spectra of the antifouling films were determined by the aforementioned GCIB-XPS measurement. An example of the measurement results is shown in FIG. 13. FIG. 13 is a graph showing narrow spectra (N1s peaks) in the depth direction of the uneven structure in the antifouling film of Example 2. In FIG. 13, the vertical axis "c/s" is an abbreviation of "counts/second". The spectra in FIG. 13 are arranged in accordance with the distance from the surface of the uneven structure; the higher the position of the spectrum is, the greater the distance from the surface is.

In the spectra in FIG. 13, the position (binding energy) of the N1s peak gradually shifts toward the plus side from the top to the bottom. In other words, as the position inside the uneven structure is closer to the surface, the position of the N1s peak gradually shifts toward the plus side. This suggests that fluorine atoms having a high electronegativity (fluorine atoms derived from the active component of Antifouling Agent F1) are close to nitrogen atoms on the surface of the uneven structure and just thereunder. This demonstrates that the nitrogen atoms on the surface of the uneven structure and just thereunder are mainly nitrogen atoms derived from the active component of Antifouling Agent F1 in the antifouling film of Example 2.

In the antifouling film, the role of the nitrogen atoms in the polymer layer (uneven structure) is presumably as follows. First, only increasing the polarity of the curable resin ensures desired properties (e.g., adhesion) while forming the uneven structure, but inversely impairs the compatibility with the fluorine-containing component (e.g., a fluorine-containing monomer) in the antifouling agent. Then, introducing a nitrogen-containing component (e.g., a component having an amide structure) into the curable resin can improve the compatibility with the antifouling agent. The nitrogen-containing component in the curable resin further contributes to the bonding between the fluorine-containing component in the antifouling agent and the curable resin, improving the leveling performance (distribution) of the fluorine-containing component.

This presumably demonstrates that, in the antifouling film of Example 2, the nitrogen-containing component is substantially evenly distributed inside the uneven structure (in deep portions thereof) while the fluorine-containing component is aligned in the form of a monomolecular film, and just thereunder a region is present where the nitrogen-containing component is concentrated (close to a portion providing the local maximum in a region 5 to 90 nm deep from the surface of the uneven structure). The region where the nitrogen-containing component is concentrated presumably contains not only the nitrogen atoms derived from the active component of Antifouling Agent F1 but also the nitrogen atoms derived from the curable resin for improving the leveling performance of the fluorine-containing component, as mentioned above. This configuration will presumably be applied to the other examples.

[Additional Remarks]

One aspect of the present invention may be an antifouling film including a polymer layer that includes on a surface thereof an uneven structure provided with multiple projections at a pitch not longer than a wavelength of visible light, the polymer layer containing carbon atoms, nitrogen atoms, oxygen atoms, and fluorine atoms as constituent atoms, the polymer layer having a proportion of the number of the fluorine atoms relative to the sum of the numbers of the carbon atoms, the nitrogen atoms, the oxygen atoms, and the fluorine atoms measured by X-ray photoelectron spectroscopy of 33 atom % or more on the surface of the uneven structure, the polymer layer having at least one local maximum of the proportion of the number of the nitrogen atoms relative to the sum of the numbers of the carbon atoms, the nitrogen atoms, the oxygen atoms, and the fluorine atoms measured by X-ray photoelectron spectroscopy in a region 5 to 90 nm deep from the surface of the uneven structure, the local maximum being 0.3 atom % or more greater than the average value in a region 90 to 120 nm deep from the surface of the uneven structure. This aspect can lead to an antifouling film having excellent antifouling properties.

The proportion of the number of the nitrogen atoms relative to the sum of the numbers of the carbon atoms, the nitrogen atoms, the oxygen atoms, and the fluorine atoms measured by X-ray photoelectron spectroscopy on the surface of the uneven structure may be 1 atom % or more smaller than the local maximum. This structure can increase the nitrogen atom proportion in a region where the nitrogen atom is concentrated, and thus can further improve the antifouling properties.

The polymer layer may be a cured product of a resin containing an antifouling agent and a curable resin. This structure can improve the antifouling properties.

The curable resin may contain a compatible monomer that is compatible with the antifouling agent. This structure allows the active component of the antifouling agent to be uniformly distributed on the surface of the polymer layer, possibly improving the antifouling properties. Further, the compatible monomer can improve the adhesion between the curable resin and the antifouling agent, possibly improving the rubbing resistance. Furthermore, occurrence of cloudiness can be prevented even if the resin contains a large amount of the antifouling agent.

The curable resin may contain the compatible monomer in an amount of 5 wt % or more and 30 wt % or less. This structure can prevent reduction in antifouling properties and rubbing resistance, especially in a high-temperature/high-humidity environment.

The antifouling agent may contain as an active component a fluorine-containing monomer containing a reactive group. This structure can improve the antifouling properties.

Fluorine atoms in the antifouling agent may be distributed on the surface of the polymer layer. This structure can further improve the antifouling properties.

The fluorine-containing monomer may be represented by the following formula (A):

$$R^{f1}-R^2-D^1 \tag{A}$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is the reactive group. This structure allows the antifouling agent to further exert the antifouling properties.

The fluorine-containing monomer may contain a fluoropolyether moiety represented by the following formula (B) or (C):

$$CF_{n1}H_{(3-n1)}-(CF_{n2}H_{(2-n2)})_kO-(CF_{n3}H_{(2-n3)})_mO- \tag{B}$$

$$-(CF_{n4}H_{(2-n4)})_pO-(CF_{n5}H_{(2-n5)})_sO- \tag{C}$$

wherein n1 is an integer of 1 to 3; n2 to n5 are each 1 or 2; and k, m, p, and s are each an integer of 0 or greater. This structure allows the antifouling agent to further exert the antifouling properties.

The antifouling agent may further contain one or both of a fluorosurfactant and a reactive monomer. This structure allows the antifouling agent to furthermore exert the antifouling properties.

The resin may contain the active component of the antifouling agent in an amount of 0.1 wt % or more and 10 wt % or less. This structure can prevent reduction in antifouling properties and rubbing resistance.

The antifouling film may have a surface that shows a contact angle of 130° or greater with water. This structure can furthermore improve the antifouling properties.

The antifouling film may have a surface that shows a contact angle of 30° or greater with hexadecane. This structure can furthermore improve the antifouling properties.

The polymer layer may have a thickness of 5.0 μm or greater and 20.0 μm or smaller. This structure allows the active component of the antifouling agent to be distributed on the surface (the surface opposite to the substrate) of the polymer layer at a high concentration.

The pitch may be 100 nm or greater and 400 nm or smaller. This structure can sufficiently prevent occurrence of optical phenomena such as moiré and iridescence.

Each of the projections may have a height of 50 nm or greater and 600 nm or smaller. This structure allows each projection to also have a preferred aspect ratio.

Each of the projections may have an aspect ratio of 0.8 or greater and 1.5 or smaller. This structure can sufficiently prevent occurrence of optical phenomena such as moiré and iridescence, enabling good reflection characteristics. This structure can also prevent poor processability of the moth-eye structure, occurrence of sticking, and poor transferring conditions in formation of the moth-eye structure.

REFERENCE SIGNS LIST

1: antifouling film
2: substrate
3: polymer layer
4: projections
5: resin
6: die
7: first resin
8: second resin
P: pitch
T: thickness of polymer layer
T1: thickness of first resin
T2: thickness of second resin

The invention claimed is:

1. An antifouling film comprising
a polymer layer that includes on a surface thereof an uneven structure provided with multiple projections at a pitch not longer than a wavelength of visible light,
the polymer layer being a cured product of a resin containing an antifouling agent and a curable resin and containing carbon atoms, nitrogen atoms, oxygen atoms, and fluorine atoms as constituent atoms,
the antifouling agent containing fluorine atoms as constituent atoms,
the curable resin containing nitrogen atoms as constituent atoms,
fluorine atoms in the antifouling agent being distributed on the surface of the polymer layer,
the polymer layer having a proportion of the number of the fluorine atoms relative to the sum of the numbers of the carbon atoms, the nitrogen atoms, the oxygen atoms, and the fluorine atoms measured by X-ray photoelectron spectroscopy of 33 atom % or more on the surface of the uneven structure,
the polymer layer having at least one local maximum of the proportion of the number of the nitrogen atoms relative to the sum of the numbers of the carbon atoms, the nitrogen atoms, the oxygen atoms, and the fluorine atoms measured by X-ray photoelectron spectroscopy in a region 5 to 90 nm deep from the surface of the uneven structure, the local maximum being 0.3 atom % or more greater than the average value in a region 90 to 120 nm deep from the surface of the uneven structure.

2. The antifouling film according to claim 1,
wherein the proportion of the number of the nitrogen atoms relative to the sum of the numbers of the carbon atoms, the nitrogen atoms, the oxygen atoms, and the fluorine atoms measured by X-ray photoelectron spectroscopy on the surface of the uneven structure is 1 atom % or more smaller than the local maximum.

3. The antifouling film according to claim 1,
wherein the curable resin contains a compatible monomer that is compatible with the antifouling agent.

4. The antifouling film according to claim 3,
wherein the curable resin contains the compatible monomer in an amount of 5 wt % or more and 30 wt % or less.

5. The antifouling film according to claim 1,
wherein the antifouling agent contains as an active component a fluorine-containing monomer containing a reactive group.

6. The antifouling film according to claim 5,
wherein the fluorine-containing monomer is represented by the following formula (A):

$$R^{f1}-R^2-D^1 \quad (A)$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is the reactive group.

7. The antifouling film according to claim 5,
wherein the fluorine-containing monomer contains a fluoropolyether moiety represented by the following formula (B) or (C):

$$CF_{n1}H_{(3-n1)}-(CF_{n2}H_{(2-n2)})_kO-(CF_{n3}H_{(2-n3)})_mO- \quad (B)$$

$$-(CF_{n4}H_{(2-n4)})_pO-(CF_{n5}H_{(2-n5)})_sO- \quad (C)$$

wherein n1 is an integer of 1 to 3; n2 to n5 are each 1 or 2; and k, m, p, and s are each an integer of 0 or greater.

8. The antifouling film according to claim 5,
wherein the antifouling agent further contains one or both of a fluorosurfactant and a reactive monomer.

9. The antifouling film according to claim 5,
wherein the resin contains the active component of the antifouling agent in an amount of 0.1 wt % or more and 10 wt % or less.

10. The antifouling film according to claim 1,
wherein the antifouling film has a surface that shows a contact angle of 130° or greater with water.

11. The antifouling film according to claim 1,
wherein the antifouling film has a surface that shows a contact angle of 30° or greater with hexadecane.

12. The antifouling film according to claim 1,
wherein the polymer layer has a thickness of 5.0 μm or greater and 20.0 μm or smaller.

13. The antifouling film according to claim 1,
wherein the pitch is 100 nm or greater and 400 nm or smaller.

14. The antifouling film according to claim 1,
wherein each of the projections has a height of 50 nm or greater and 600 nm or smaller.

15. The antifouling film according to claim 1,
wherein each of the projections has an aspect ratio of 0.8 or greater and 1.5 or smaller.

16. The antifouling film according to claim 1,
wherein the antifouling agent further contains nitrogen atoms as constituent atoms.

17. The antifouling film according to claim 16,
wherein, in a portion providing the local maximum in the region 5 to 90 nm deep from the surface of the uneven structure, nitrogen atoms derived from the antifouling agent and nitrogen atoms derived from the curable resin are present.

18. The antifouling film according to claim 3,
wherein the compatible monomer includes a monofunctional monomer containing an amide group.

19. The antifouling film according to claim 5,
wherein the fluorine-containing monomer contains one or both of the —$OCF_2$— chain and the =NCO— chain.

20. The antifouling film according to claim 8,
wherein the reactive monomer includes an amide-containing monomer.

* * * * *